(12) United States Patent  (10) Patent No.: US 8,586,511 B2
Chen et al.  (45) Date of Patent: *Nov. 19, 2013

(54) SCALE INHIBITING WELL TREATMENT (75) Inventors: Ping Chen, Aberdeen (GB); Xing Yan, Aberdeen (GB); Thomas Hagen, Stavanger (NO); Harry Montgomerie, Aberdeen (GB)

(73) Assignee: Champion Technologies Ltd., Aberdeen (GB)

( * ) Notice: Subject to any disclaimer, the term of this patent is extended or adjusted under 35 U.S.C. 154(b) by 241 days.

This patent is subject to a terminal disclaimer.

(21) Appl. No.: 11/997,879

(22) PCT Filed: Aug. 2, 2006

(86) PCT No.: PCT/GB2006/002877
§ 371 (c)(1),
(2), (4) Date: Jun. 11, 2008

(87) PCT Pub. No.: WO2007/015090
PCT Pub. Date: Feb. 8, 2007

(65) Prior Publication Data
US 2008/0248974 A1 Oct. 9, 2008

(30) Foreign Application Priority Data
Aug. 4, 2005 (GB) .................................. 0516068.4

(51) Int. Cl.
C09K 8/60 (2006.01)
C09K 8/52 (2006.01)
E21B 37/06 (2006.01)
E21B 43/26 (2006.01)

(52) U.S. Cl.
USPC ........... 507/222; 507/90; 166/304; 166/305.1

(58) Field of Classification Search
USPC .......................... 507/90, 222; 166/304, 305.1
See application file for complete search history.

(56) References Cited

U.S. PATENT DOCUMENTS 3,912,693 A * 10/1975 Shimizu et al. .................... 522/4
4,455,240 A * 6/1984 Costello ........................ 507/119
4,460,477 A 7/1984 Costello et al. ................ 210/701
4,484,631 A 11/1984 Sherwood et al. ............ 166/400
4,510,059 A 4/1985 Amjad et al. .................. 210/701
4,801,388 A 1/1989 Fong et al. .................... 210/701

(Continued)

FOREIGN PATENT DOCUMENTS

CA 2059182 7/1992
CA 02059182 A1 * 7/1992

(Continued)

OTHER PUBLICATIONS

Hall, et al., "The photoinitiated cyclopolymerization of dienes in the creation of novel polymeric systems and three-dimensional networks," 14 J. Mater. Chem. 2593-2602 (2004).

(Continued)

*Primary Examiner* — Ling-siu Choi
*Assistant Examiner* — Aiqun Li
(74) *Attorney, Agent, or Firm* — Ballard Spahr LLP (57) ABSTRACT

This invention provides a method for inhibiting scale formation within a hydrocarbon producing system, said method comprising contacting said system with a copolymer formed from a diallyl ammonium salt and at least one other monomer.

18 Claims, 4 Drawing Sheets

(56) References Cited

U.S. PATENT DOCUMENTS

| | | | |
|---|---|---|---|
| 5,015,390 A * | 5/1991 | Chen et al. | 210/698 |
| 5,038,861 A | 8/1991 | Shuler | 166/279 |
| 5,092,404 A | 3/1992 | Falk et al. | 166/279 |
| 5,181,567 A | 1/1993 | Shuler | 166/279 |
| 5,213,691 A * | 5/1993 | Emmons et al. | 210/700 |
| 5,604,185 A | 2/1997 | Hen | 507/119 |
| 5,609,862 A * | 3/1997 | Chen et al. | 424/70.11 |
| 5,939,362 A | 8/1999 | Johnson et al. | 507/118 |
| 6,225,430 B1 | 5/2001 | Fong et al. | 526/271 |
| 6,436,878 B1 | 8/2002 | Wang et al. | 507/119 |
| 2005/0067164 A1 * | 3/2005 | Ke et al. | 166/304 |
| 2008/0248974 A1 | 10/2008 | Chen et al. | 507/90 |

FOREIGN PATENT DOCUMENTS

| | | |
|---|---|---|
| CN | 1118532 | 8/2003 |
| EP | 0 082 567 | 6/1983 |
| EP | 0 082 657 | 6/1983 |
| EP | A-0082657 | 6/1983 |
| EP | A-0161763 | 11/1985 |
| EP | A-0521666 | 1/1993 |
| EP | A-0643081 | 3/1995 |
| GB | A-1447911 | 9/1974 |
| WO | WO 2004/011772 | 2/2004 |
| WO | WO 2007/015090 | 2/2007 |
| WO | WO 2007/080417 | 7/2007 |

OTHER PUBLICATIONS

Hammerschmidt, et al., "The Phosphonate-Phosphate and Phosphate-Phosphonate Rearrangement and Their Applications V[1]. On the Reaction of sbutyllithium/*TMEDA* with Symmetrical Trialkyl Phosphates," 128 Monatshefte Für Chemie 1173-1180 (1997).

U.S. Appl. No. 12/160,104, filed Jan. 25, 2010, Non-Final Office Action.

U.S. Appl. No. 12/160,104, filed Jun. 25, 2010, Response to Non-Final Office Action.

U.S. Appl. No. 12/160,104, filed Jul. 21, 2010, Non-Final Office Action.

U.S. Appl. No. 12/160,104, filed Oct. 21, 2010, Response to Non-Final Office Action.

U.S. Appl. No. 12/160,104, filed Dec. 9, 2010, Final Office Action.

U.S. Appl. No. 12/377,331, filed Oct. 28, 2010, Published Application.

Non-Final Office Action issued Mar. 7, 2012 by the United States Patent and Trademark Office for U.S. Appl. No. 12/160,104, filed Jan. 15, 2007 (Applicant—Champion Technologies Limited // Inventor—Montgomerie, et al.; (pp. 1-15 ).

Notice of Allowance issued Sep. 4, 2012 by the United States Patent and Trademark Office for U.S. Appl. No. 12/160,104, filed Jan. 15, 2007 (Applicant—Champion Technologies Limited // Inventor—Montgomerie, et al.; (pp. 1-8).

Response to Non-Final Office Action filed Jul. 30, 2012 to the United States Patent and Trademark Office for U.S. Appl. No. 12/160,104, filed Jan. 15, 2007 (Applicant—Champion Technologies Limited // Inventor—Montgomerie, et al.; (pp. 1-16).

International Preliminary Report on Patentability issued Oct. 24, 2007 by the International Searching Authority for Application No. PCT/GB2006/002877 filed Aug. 2, 2006 (Applicant—Champion Technologies Limited // Inventor—Chen, et al.) (pp. 1-16).

International Search Report issued Nov. 23, 2006 by the International Searching A Authority for Application No. PCT/GB2006/002877 filed Aug. 2, 2006 (Applicant—Champion Technologies Limited // Inventor—Chen, et al.) (pp. 1-5).

Written Opinion issued Nov. 23, 2006 by the International Searching Authority for Application No. PCT/GB2006/002877 filed Aug. 2, 2006 (Applicant—Champion Technologies Limited // Inventor—Chen, et al.) (pp. 1-9).

International Preliminary Report on Patentability issued Mar. 28, 2008 by the Searching Authority International Searching Authority for Application No. PCT/Gb2007/000099 filed Jan. 15, 2007 (Applicant—Champion Technologies Limited // Inventor—Montgomerie, et al.) (pp. 1-11).

International Search Report issued Apr. 27, 2007 by the International Searching Authority for Application No. PCT/Gb2007/000099 filed Jan. 15, 2007 (Applicant—Champion Technologies Limited // Inventor—Montgomerie, et al.) (pp. 1-2).

Written Opinion issued Apr. 27, 2007 by the international Searching Authority for Application No. PCT/Gb2007/000099 filed Jan. 15, 2007 (Applicant—Champion Technologies Limited // Inventor—Montgomerie, et al.) (pp. 1-5).

\* cited by examiner

FIG. 4

SCALE INHIBITING WELL TREATMENT

CROSS-REFERENCE TO RELATED APPLICATIONS

The present application is a National Phase Application of International Application No. PCT/GB2006/002877, filed Aug. 2, 2006, which claims priority to Great Britain Patent Application No. 0516068.4, filed Aug. 4, 2005, which applications are incorporated herein fully by this reference.

This invention relates to a method of reducing scale formation in a hydrocarbon well, and to novel scale inhibitors for use in this method.

During the operation of a hydrocarbon well (i.e. a gas or oil well) various down-hole problems can arise including the deposition of scale which inhibits the hydrocarbon flow. Scale is a water-related problem which arises as a result of the commingling of incompatible aqueous fluids in the formation (i.e. the rock). For example, where sea water is injected into a subterranean formation to drive oil through the formation into a producer well hole, differences in the nature of the ions present in the injection water and that already present in the formation may cause the precipitation of metal salts. In the North Sea, typical scale problems are related to the formation of inorganic salts such as $BaSO_4$, $SrSO_4$, $CaSO_4$ and $CaCO_3$. These salts precipitate as scale which, if left untreated, causes scaling of subsurface and surface production equipment and/or tubing and, eventually, blockage of the well hole. Commingling of incompatible aqueous fluids usually occurs within the near well bore area of a subterranean formation. The severity of the problem is highly dependent on the field operating conditions, which can vary from mild scaling tendencies to the extreme.

Typically, to prevent scale from forming in the system, a chemical inhibitor is injected continuously and/or by periodic "squeeze" treatments. The scale inhibitor prevents the formation of scale thereby increasing oil or gas flow. Chemical scale inhibitors are thought to act either through nucleation inhibition or crystal retardation. In crystal retardation, a scale inhibitor is believed to adsorb onto the active sites of scale crystals thereby preventing further scale crystal growth. In nucleation inhibition, the mechanism of scale inhibition involves endothermic adsorption of inhibitor species which causes dissolution of the scale (e.g. barium sulphate) embryos.

In the case of reservoir treatments intended to protect the critical near well bore area, "squeeze" treatments are normally the best option. In a "squeeze" treatment, a scale inhibitor at concentrations between 5-20% by weight is normally injected into the formation through a producer well hole after a pre-flush. After over-flush and shut-in, well production is then resumed. Ideally the scale inhibitor is leached or washed back to the surface of the formation by the production water at a required minimum concentration to prevent scale formation both in the well and in the near well bore area. More specifically the leaching process should place a low, but still effective, concentration (e.g. around 1-50 ppm) of the scale inhibitor in the produced water to prevent scale deposition. Depending on the inhibitor retention and release properties in the formation, however, the effect of this treatment may last from one month to about 24 months. For economic reasons, a prolonged period of protection from scale formation is clearly desirable.

An ideal scale inhibitor return curve for scale inhibitor concentration is one where, after the overflush is complete, the inhibitor desorbs into the produced water at a rate that provides a constant concentration that is the minimum required to prevent scale formation. Even more ideally, this process continues until all of the scale inhibitor squeezed into the formation is released in this way.

Typically, however, squeeze treatments do not provide ideal scale inhibitor return curves. Usually the concentration of scale inhibitor in the produced water is initially high, and much greater than that required to prevent scale formation, as a result of inhibitor failing to adsorb to the formation. Thereafter the concentration of scale inhibitor tends to decrease until it eventually falls below the minimum required to prevent scale deposition. The process is therefore inefficient as a large proportion of the inhibitor introduced in the squeeze treatment is returned almost immediately and does not serve to prevent scale formation. Moreover regular repetition of scale inhibitor treatment is highly undesirable as oil production invariably needs to be stopped to allow the treatment to be carried out.

For use as "squeeze" chemicals, the two main properties required for scale inhibitors are as follows:
(i) Threshold inhibition: the chemical should be capable of inhibiting scale formation at very low concentrations, typically of the order of 1-30 ppm.
(ii) Long "squeeze" lifetime: the chemical should show a long return profile from the reservoir (typically 3-12 months) at levels above the required threshold level or minimum inhibition concentration (MIC).

Thus, an effective "squeeze" treatment scale inhibitor should not only be capable of inhibiting scale, but also have the desired interaction with the formation to provide sufficiently extended return curves. In addition to the above, the scale inhibitor should be compatible with the field brines and relatively stable to thermal degradation at reservoir conditions.

A wide range of scale inhibitors is commercially available, but the vast majority are designed for treatment of simple aqueous systems, e.g. boiler water, cooling and heating systems. Treatment of such systems is, however, much more straightforward than inhibiting scale in a hydrocarbon system as, once added to the system, the scale inhibitor simply circulates therethrough (i.e. the system is closed). As a result, there is no requirement that the inhibitor have a specific interaction within the system in order for it to be retained for a period of time. Hence scale inhibitors that are useful in simple aqueous systems are often not suitable for treatment of a hydrocarbon well.

Scale inhibitors commonly used in the oil industry include phosphonates, phosphonate esters, sulphonates and polymers such as homo- and copolymers comprising phosphonate, sulphonate and/or carboxylate groups. However, in some circumstances, these chemicals are unable to prevent scale precipitation, e.g. where the scaling potential is extremely high.

Thus, there is still a need for alternative methods of well treatment which inhibit (e.g. prevent) scale formation, and in particular, for methods which improve scale inhibition efficiency and/or extend the effects of a "squeeze" treatment. In addition, due to increased environmental concerns, the scale inhibitors for use in such methods should preferably exhibit good biodegradation properties with low toxicity and low bioaccumulation.

We have now found that certain polymeric agents are especially suitable for use as scale inhibitors, particularly when applied as a "squeeze" treatment.

Thus viewed from one aspect the invention provides a method for inhibiting (e.g. preventing) scale formation within a hydrocarbon producing system (e.g. a subterranean formation), said method comprising contacting said system with a copolymer formed from a diallyl ammonium salt and at least one other monomer.

In a preferred embodiment of the method of the present invention, said method comprises squeeze treating said system with a copolymer as hereinbefore defined.

Viewed from another aspect the invention provides the use of a copolymer formed from a diallyl ammonium salt and at least one other monomer as a scale inhibitor in a hydrocarbon producing system.

Viewed from a still further aspect the invention provides the use of a copolymer formed from a diallyl ammonium salt and at least one other monomer for the manufacture of a treatment composition for the inhibition (e.g. prevention) of scale formation in a hydrocarbon producing system.

Viewed from yet another aspect the invention provides a hydrocarbon well treatment composition comprising a carrier liquid and a copolymer formed from a diallyl ammonium salt and at least one other monomer.

As used herein the term "scale" is intended to encompass any precipitate which may be formed within a hydrocarbon (i.e. oil or gas) producing system. In hydrocarbon producing systems, typical examples of scale include sulphate and carbonate salts of group I and group II metals, e.g. $BaSO_4$, $SrSO_4$, $CaSO_4$ and $CaCO_3$.

The term "hydrocarbon producing system" is used herein to encompass the subterranean formation (e.g. rock) from which hydrocarbon is extracted as well as the equipment used in the extraction process. This equipment includes both subsurface and surface equipment (e.g. tubes, pipes, pumps, valves, nozzles, storage containers, screens, etc). In a preferred aspect of the present invention the scaling of hydrocarbon extraction equipment is inhibited or prevented.

The term "squeeze treating" is used herein to refer to a method wherein a scale inhibitor is introduced into a hydrocarbon producing system and after well production is resumed, the scale inhibitor is returned in the production waters at a concentration effective to inhibit scale formation for a period of at least 6 months, more preferably at least 9 months, e.g. at least 12 months. Squeeze treatment may optionally include a preflush and/or an overflush.

As used herein the term "copolymer" is used to denote a polymer made from two or more (e.g. 2 or 3) different monomers. Typical copolymers for use in the invention will comprise at least 5 wt. %, preferably at least 10 wt. %, e.g. at least 20 wt. % of each monomer relative to the total weight of monomers. Preferred copolymers for use in the present invention are those made from two or three different monomers, preferably two different monomers or more preferably three different monomers.

Diallyl ammonium salts suitable for use in the present invention include compounds of formula (I):

(I)

(wherein
$R^1$ and $R^2$ are each independently hydrogen or optionally substituted organic radicals having from 1 to 20 carbon atoms, preferably 1 to 12 carbon atoms, e.g. 1 to 6 carbon atoms;

each R is independently selected from hydrogen and organic radicals having from 1 to 20 carbon atoms, e.g. 1 to 6 carbon atoms; and
X is a counterion which may optionally be covalently bonded to either $R^1$ or $R^2$).

Preferred monomers of formula (I) are those wherein each R is a hydrogen atom or a substituted or unsubstituted, preferably unsubstituted, alkyl, alkenyl or aryl group. Particularly preferably, each R is a hydrogen atom or an alkyl group (e.g. methyl or ethyl). Although each R may be different, in preferred monomers of formula (I) each R is the same. Still more preferably, each R is a hydrogen atom.

In formula (I), X is preferably sulfate, phosphate or a halide, especially chloride.

In particularly preferred monomers of formula (I), X is not covalently bonded to either $R^1$ or $R^2$ (i.e. it stands as a separate or free counterion). In these monomers, $R^1$ and $R^2$ are each independently a substituted or unsubstituted, preferably unsubstituted, alkyl, alkenyl or aryl group. Particularly preferably, $R^1$ and $R^2$ are each independently an alkyl group, especially an unsubstituted alkyl group. Preferred alkyl groups have from 1 to 8 carbon atoms, e.g. $C_{1-6}$. Representative examples of preferred alkyl groups include methyl, ethyl, propyl, butyl and pentyl. Methyl is particularly preferred. Although $R^1$ and $R^2$ may be different, in preferred monomers of formula (I), $R^1$ and $R^2$ are the same (e.g. $R^1$ and $R^2$ are both methyl).

In formula (I), X may be covalently linked either to $R^1$ or $R^2$. The structure of a monomer of this type in which X is linked to $R^2$ is shown below in formula (Ia):

(Ia)

(wherein
R, $R^1$, $R^2$ and X are as hereinbefore defined).

In those monomers where X is covalently bonded to $R^1$ or $R^2$ (e.g. in monomers of formula (Ia)), the $R^1/R^2$ group to which it is bound is preferably an unsubstituted, alkyl, alkenyl or aryl group. Particularly preferably, the $R^1/R^2$ group to which X is bound is an alkyl group (e.g. a $C_{1-8}$ alkyl group, more preferably a $C_{1-4}$ alkyl group). Ethyl (—$CH_2CH_2$—) is particularly preferred. The remaining $R^1/R^2$ group (i.e. $R^2$ when X is bound to $R^1$ and vice versa) is preferably as defined above for $R^1$ and $R^2$ when X is not covalently bound to the monomer structure.

Copolymers for use in the invention may comprise one or more (e.g. 2 or 3, preferably 2) different monomers of formula (I). Preferably, however, the copolymers comprise one type of monomer of formula (I).

A particularly preferred copolymer for use in the invention is that formed from diallyldimethyl ammonium chloride (DADMAC). DADMAC is commercially available from Chengdu Cation Chemistry Company, China.

Preferred copolymers for use in the invention are additionally formed from an anionic monomer. By an "anionic monomer" is meant a monomer carrying a group capable of providing a negative charge on the resulting polymer chain.

Typical anionic monomers include those carrying a carboxylic (i.e. —CO$_2$H) or sulfonic acid (i.e. —SO$_3$H) group. Copolymers for use in the invention may comprise one or more (e.g. 2 or 3, preferably 2) different anionic monomers. Particularly preferred copolymers for use in the invention comprise anionic monomers providing at least two different anionic groups (e.g. —CO$_2$H and —SO$_3$H or —CO$_2$H and —PO$_3$H$_2$). By an "anionic group" is meant a group capable of providing a negative charge on the resulting polymer chain.

Anionic monomers suitable for use in the present invention include compounds of formula (II):

(wherein
R$^3$ is —CO$_2$Z, —SO$_3$Z, —PO$_3$Z$_2$ or an alkyl or aryl group (e.g. a C$_{1-10}$ alkyl or aryl group) substituted with at least one (e.g. one) —CO$_2$Z, —SO$_3$Z or —PO$_3$Z$_2$ group in which Z is a hydrogen atom or a univalent metal atom;
R$^4$, R$^5$ and R$^6$ are each independently hydrogen, an optionally substituted alkyl or aryl group having from 1 to 6 carbon atoms or a group R$^3$ as hereinbefore defined).

In preferred monomers of formula (II), R$^3$ is —CO$_2$Z, —SO$_3$Z, —PO$_3$Z$_2$ or an alkyl or aryl group (e.g. a C$_{1-10}$ alkyl or aryl group) substituted with at least one (e.g. one) —CO$_2$Z, —SO$_3$Z or —PO$_3$Z$_2$ group in which Z is a hydrogen atom or a univalent metal atom;
R$^4$ is hydrogen or an optionally substituted alkyl or aryl group having from 1 to 6 carbon atoms; and
R$^5$ and R$^6$ are each independently hydrogen or a group R$^3$ as hereinbefore defined).

In preferred monomers of formula (IIa), R$^3$ is —CO$_2$Z, —SO$_3$Z, —PO$_3$Z$_2$ or an aryl group (e.g. a phenyl group) substituted with at least one (e.g. one) —CO$_2$Z, —SO$_3$Z or —PO$_3$Z$_2$ group. Particularly preferably, R$^3$ is a —CO$_2$Z, —SO$_3$Z, or —PO$_3$Z$_2$ group (e.g. a —CO$_2$Z group or a —PO$_3$Z$_2$ group, particularly a —PO$_3$Z$_2$ group). In further preferred monomers of formula (IIa) the group Z is hydrogen or a group I or II metal atom (e.g. sodium or potassium).

Preferred monomers of formula (IIa) are also those wherein R$^4$ is a hydrogen atom or a substituted or unsubstituted, preferably unsubstituted, alkyl group. Particularly preferably R$^4$ is hydrogen or a C$_{1-3}$ alkyl group (e.g. methyl). Still more preferably R$^4$ is hydrogen.

In further preferred monomers of formula (IIa), R$^5$ and R$^6$ are independently hydrogen, —CO$_2$Z, —SO$_3$Z, —PO$_3$Z$_2$ or an aryl group (e.g. a phenyl group) substituted with a —CO$_2$Z, —SO$_3$Z or —PO$_3$Z$_2$ group wherein Z is as hereinbefore defined. Although R$^5$ and R$^6$ may be different, in preferred monomers of formula (IIa), R$^5$ and R$^6$ will be the same. Still more preferably R$^5$ and R$^6$ are both hydrogen atoms.

In preferred monomers of formula (IIb) R$^4$ and R$^5$ are independently a hydrogen atom or a substituted or unsubstituted, preferably unsubstituted, alkyl group. Particularly preferably R$^4$ and R$^5$ are hydrogen or a C$_{1-3}$ alkyl group (e.g. methyl). Still more preferably R$^4$ and R$^5$ are hydrogen. Although R$^4$ and R$^5$ may be different, in preferred monomers of formula (IIb), R$^4$ and R$^5$ will be the same.

Preferred copolymers for use in the method of the invention comprise monomers of formula (IIa).

Particularly preferred copolymers for use in the present invention comprise an anionic monomer selected from acrylic acid, methacrylic acid, vinyl sulfonic acid, vinyl phosphonic acid, maleic anhydride, itaconic acid, maleic acid or styrene sulfonic acid. Especially preferred anionic monomers include acrylic acid, vinyl sulfonic acid and vinyl phosphonic acid, especially acrylic acid and vinyl phosphonic acid (e.g. vinyl phosphonic acid). Such monomers are commercially available, e.g. from Aldrich Chemical Company Inc.

Copolymers for use in the invention may comprise one or more (e.g. 2 or 3, preferably 2) different monomers of formula (II). Some preferred copolymers comprise one type of monomer of formula (II). Other preferred copolymers comprise at least two (e.g. 2) types of monomers of formula (II) (e.g. two types of monomers of formula (IIa)).

Preferred copolymers for use in the invention comprise anionic monomers of formula (II) providing at least two different anionic groups. A preferred copolymer for use in the invention comprises a monomer of formula (IIa) wherein R$^3$ is —CO$_2$Z and a second monomer wherein R$^3$ is —SO$_3$Z or —PO$_3$Z$_2$ (e.g. —SO$_3$Z) and R$^4$, R$^5$ and R$^6$ in each monomer are as hereinbefore defined.

A particularly preferred copolymer for use in the invention comprises acrylic acid and vinyl sulfonic acid. Another particularly preferred copolymer comprises acrylic acid and vinyl phosphonic acid.

Further preferred copolymers for use in the invention do not comprise non-ionic monomers. Thus preferred copolymers do not comprise acrylamide, methyacrylamide, N,N-dimethyl acrylamide, acrylonitrile, vinyl acetate, vinyl pyridine, hydroxyalkyl acrylates, methacrylate, butadiene, styrene, esters of olefinic carboxylic acids, alkylene oxides, divinyl ketones, vinyl ketones, divinyl ethers and alkyl vinyl ether monomers. Particularly preferably the copolymers for use in the invention do not comprise acrylamide monomers.

The copolymers for use in the invention may be prepared by any conventional polymerisation procedure known in the art (e.g. bulk polymerisation, solution polymerisation or suspension polymerisation). Solution polymerisation is preferred. Those skilled in the art will be aware of suitable reaction conditions as well as appropriate catalysts, polymerisation initiators and chain transfer agents. Preferred copolymers for use in the invention include those obtainable by polymerisation (e.g. by solution polymerisation) of at least one monomer of formula (I) and at least one (e.g. two) anionic monomer(s), e.g. a monomer(s) of formula (II). Preferred copolymers are those obtainable by polymerisation of monomers of formulae (I) and (II) in a molar ratio of 1:10-100, more preferably 1:20-50 respectively.

Particularly preferred copolymers for use in the invention comprise repeating units represented by formula (III) and/or formula (IV):

(wherein
R, $R^1$, $R^2$, $R^3$, $R^4$, $R^5$, $R^6$ and X are as hereinbefore defined;
n is an integer from 10 to 200, preferably 15 to 150, more preferably 20 to 100, e.g. about 50; and
m is an integer from 1 to 50, preferably 5 to 40, more preferably 10 to 30, e.g. about 15).

In the copolymers herein described the repeat units deriving from monomers of formulae (I) and (II) may be distributed randomly along the length of the polymer chain (i.e. the copolymer may be a random polymer). Alternatively the copolymer may be a block or alternating copolymer. Preferred copolymers for use in the invention are random copolymers. Formulae (III) and (IV) are not, however, intended to represent any particular copolymer. Rather, in formulae (III) and (IV), "n" and "m" are simply intended to denote the total number of each repeat unit deriving from monomers of formulae (II) and (I) in the polymer chain, respectively (i.e. they do not represent the way in which the monomers are distributed throughout the polymer). In preferred copolymers the sum of n and m is 20 to 200, preferably 30 to 100, e.g. about 40 to 80.

During polymerisation of the monomers described herein various different bonds may form. For example, a bond may be formed between a —$CR^3R^4$ carbon atom of a first anionic monomer of formula (IIa) and a carbon atom of a monomer of formula (I). Alternatively, a bond may be formed between a —$CR^5R^6$ atom of an anionic monomer of formula (IIa) and a carbon atom of a monomer of formula (I). Formulae (III) and (IV) are intended to encompass all such resulting copolymers (i.e. these structures are merely schematic and are not intended to be limited to the particular linkage which is shown). Copolymers for use in the present invention may comprise any mixture of such bonds.

The polymerisation reaction may also involve an intramolecular-intermolecular mechanism sometimes called cyclopolymerisation. In this mechanism a 5- or 6-membered ring may be formed from the monomer of formula (I) in the polymerisaton reaction (by an intramolecular reaction). The ring then reacts with a further monomer (e.g. a monomer of formula (I) or formula (II)) in an intermolecular reaction to extend the length of the polymer chain. Further intramolecular and intermolecular reactions may then occur.

During the intramolecular reaction step of the polymerisation, the new bond may be formed between the terminal carbon atom of one allyl group (i.e. at =N—$CR_2$—CR=$CR_2$) and the central carbon atom of the second allyl group (i.e. at =N—$CR_2$—CR=$CR_2$). This reaction yields a 6-membered ring (i.e. forms a repeat unit of formula (IV)). Alternatively, the new bond may be formed between the central carbons atom of both allyl groups. This reaction yields a 5-membered ring (i.e. forms a repeat unit of formula (III)).

The copolymers for use in the invention may comprise any ratio of repeat units of formulae (III) and (IV). For instance, the ratio of (III):(IV) may be in the range 99:1 to 1:99. More preferably the ratio of (III):(IV) is in the range 98:2 to 50:50, e.g. at least 95:5. Still more preferably the copolymer for use in the invention is substantially free from repeat units of formula (IV) (e.g. the polymer comprises less than 2% wt repeating units of formula (IV)). Copolymers which consist essentially of the repeat units shown in formula (IV) are particularly preferred.

Preferably the copolymers for use in the present invention are substantially linear. For example, it is preferred that less than 10%, more preferably less than 5% cross linking is present. Still more preferably the copolymers for use in the present invention are water-soluble.

The weight average molecular weight of the copolymer for use in the present invention is preferably in the range 800 to 500,000, more preferably 1,000 to 100,000, still more preferably 1,500 to 10,000, e.g. 2000 to 5000.

Preferred copolymers for use in the invention are also those with one or more inorganic end groups. By an "end group" is meant a non-monomeric group which is located at an end of the polymer chain and is covalently attached to the monomer adjacent thereto. Representative examples of preferred inorganic end groups include —$SO_4H$, —$SO_3H$, —$H_2PO_3$, —$H_2PO_4$ and salts thereof. Further preferred end groups include anionic derivatives of the afore-mentioned groups (e.g. —$SO_4^-$, —$SO_3^-$ —$HPO_3^-$ and —$HPO_4^-$).

Copolymers for use in the invention may have one or more (e.g. 1 or 2) end groups. The end groups may be bound to repeat units deriving from diallyl ammonium salts and/or repeat units deriving from an anionic monomer (e.g. a monomer of formula (II)). In preferred copolymers for use in the invention at least one end group is covalently bound to a repeat unit deriving from an anionic monomer (e.g. a monomer of formula (II)).

Particularly preferred copolymers for use in the invention comprise phosphorus atoms. These facilitate measurement of the concentration of copolymer in the production waters (e.g. by ICP). Still more preferably copolymers for use in the invention comprise phosphorus atoms in the form of phosphate esters. The phosphate ester may, for example, be bound to a monomer of formula (II), e.g. a monomer carrying a —$CO_2H$ group. In this case the polymer comprises α-polymer-CO—O—P(O)($OH_2$) linkage.

Phosphate esters may be incorporated into the polymer during polymerisation from a chain transfer agent and/or initiator. Use of hypophosphorus acid or salts thereof as a chain transfer agent during polymerisation, for example, yields such groups.

A particularly preferred copolymer for use in the present invention is prepared by polymerising a monomer of formula (I) with another monomer (e.g. a monomer of formula (II)). Thus viewed from a still further aspect the invention provides a method of making a copolymer formed from a diallyl ammonium salt and at least one other monomer comprising polymerising a monomer of formula (I) with another monomer, preferably an anionic monomer (e.g. a monomer of formula (II)).

Polymerisation is preferably carried out in solution. Still more preferably the polymerisation is carried out in water. The pH of the polymerisation medium is preferably 4 to 7, still more preferably 5 to 6.5. If necessary the pH of the medium can be adjusted by addition of a neutralising solution (e.g. NaOH (aq.)).

An initiator will typically be used to start polymerisation. Any water soluble initiator can be employed for this purpose, e.g. hydrogen peroxide, dialkyl peroxides, persulfates and azo compounds. Sodium persulfate is a preferred initiator. Initiators are generally used in an amount of 0.1-10% wt of the total weight of monomers, more preferably 0.5-5% wt of the total weight of monomers, e.g. about 1-2% wt of the total weight of monomers.

In a preferred polymerisation method, a chain transfer agent is also used. Any conventional chain transfer agent may be utilised although hypophosphorus acid and salts thereof are preferred. Hypophosphorus acid and salts thereof may advantageously provide polymers having end groups as hereinbefore defined. Chain transfer agents are typically used in an amount of 1-20% wt of the total weight of monomers, more preferably 2-10% wt of the total weight of monomers.

The polymerisation reaction will typically be carried out at a temperature of 60 to 120° C., preferably 80 to 110° C., e.g. about 100° C. Generally polymerisation occurs for 1 to 4 hours, e.g. about 2 to 3 hours.

Thus, in a typical polymerisation method, monomers (e.g. DADMAC and acrylic acid) are dissolved in water and heated to 60-100° C. A neutralising solution (e.g. NaOH solution) is then optionally added (e.g. if acrylic acid monomers are employed). Initiator and chain transfer agent, both dissolved in water, are added and the temperature is increased until reflux occurs. Generally polymerisation will occur for about 2 hours. The polymer may then be isolated by conventional techniques.

A copolymer obtainable by a method as hereinbefore described forms a further aspect of the invention.

Viewed from yet another aspect the invention provides a copolymer formed from a diallyl ammonium salt and at least one other monomer as hereinbefore defined.

Whilst not wishing to be bound by theory, it is believed that the multiple positive and negative charges (especially positive charges) of the copolymers hereinbefore described offer the desirable level of absorptivity to the surface of the formation for use as a scale inhibitor, especially by a "squeeze" treatment. At the same time, the mixture of charges presented by the copolymer of the invention may function to bind or trap cations (e.g. $Ba^{2+}$, $Sr^{2+}$, $Ca^{2+}$) and anions (e.g. $SO_3^{2-}$, $CO_3^{2-}$) deriving from sea water and the subterranean formation, such that they become polymer bound. More specifically it is thought that by "fixing" the copolymers of the present invention to the surface of the formation (e.g. by electrostatic attraction) they serve to physically block scale formation as well as serving as a means to bind or trap scale forming cations and/or anions. The result is that the aforementioned cations and anions cannot undergo reaction with each other therefore the formation of scale is inhibited or prevented, especially on the surface of equipment.

The copolymers for use in the invention are preferably applied as a solution or dispersion (e.g. a solution) in a liquid carrier. The liquid carrier may be aqueous or non-aqueous. Suitable non-aqueous carriers include alkanols, particularly polyols (e.g. a glycol). Particularly preferred glycols include those of the formula $(CH_2)_n(OH)_2$ wherein n is 2 to 6 (e.g. ethylene glycol). Still more preferably the liquid carrier is aqueous (e.g. sea water).

When the liquid carrier is aqueous, it is preferred that the solution or dispersion of copolymer in carrier liquid has a pH less than 7. Preferably the pH of copolymer solution/dispersion is 1 to 6, more preferably 2 to 5, e.g. about 3 to 4.

The concentration of the copolymer in the carrier liquid will be an amount effective to inhibit scale formation and will be readily determined by those skilled in the art. Typically, however, the copolymer will be present in the liquid carrier at a concentration of 0.05 to 50% wt, preferably 0.1 to 30% wt, more preferably 1 to 20% wt, e.g. about 5 to 10% wt or 6 to 15% wt. Such carrier liquids may provide an inhibitor concentration in the fluids present in a hydrocarbon formation that is the minimum required to prevent inorganic scale formation (e.g. at least 1 ppm (by volume), more preferably at least 5 ppm (by volume) or 20 ppm (by volume)). Representative examples of inhibitor concentrations in the fluids of a formation are 1 to 10,000 ppm (by volume), more preferably 10 to 5000 ppm (by volume), still more preferably 20 to 1000 ppm (by volume, e.g. about 50 ppm (by volume). More preferably the carrier liquid provides an inhibitor concentration in the fluids of a formation of 1 to 50 ppm (by volume), still more preferably 1 to 10 ppm (by volume), e.g. about 5 ppm (by volume).

The liquid carrier may also contain other additives known in the art for use in well treatment. Such additives include surfactants, thickeners, diversion agents, corrosion inhibitors, pH buffers, catalysts and other scale inhibitors. Preferably the liquid carrier further comprises a conventional scale inhibitor. Representative examples of conventional scale inhibitors that may be used in the method of the invention include hexamethylene diamine tetrakis (methylene phosphonic acid), diethylene triamine tetra (methylene phosphonic acid), diethylene triamine penta (methylene phosphonic acid), polyacrylic acid (PAA), phosphino carboxylic acid (PPCA), diglycol amine phosphonate (DGA phosphonate), 1-hydroxyethylidene 1,1-diphosphonate (HEDP phosphonate), bisaminoethylether phosphonate (BAEE phosphonate) and 2-acrylamido-2-methyl-1-propanesulphonic acid (AMPS).

Particularly preferably the liquid carrier consists essentially of a copolymer as hereinbefore defined and optionally a further scale inhibitor. Still more preferably the liquid carrier consists essentially of a copolymer as hereinbefore defined.

The amount of treatment composition to be used to inhibit scale formation will vary widely depending on factors such as the nature of the copolymer used, the nature of the formation (e.g. the levels of Ba, Sr and Ca present) and so on. The appropriate amount of copolymer will be readily determined by those skilled in the art. Typically, however, a copolymer may be employed with a 10% treatment solution in an amount in the range of from 0.01 to 5 tons per $m^3$ of formation to be treated, more preferably from 0.02 to 0.01 tons per $m^3$ The treatment method of the present invention may be applied to a hydrocarbon producing system at any stage, e.g. before and/or after hydrocarbon production. Treatment according to the invention may also be repeated as many times as necessary.

Treatment according to the method of the present invention may be conducted according to any techniques conventional in the art and any convenient equipment may be used to supply the treatment composition to the hydrocarbon producing system. For instance, bull heading or coil tubing may be used. Thus the treatment composition may be introduced into a well bore by, for example, injection under pressures sufficient to penetrate the formation and the equipment present therein. A preferred method for introducing the copolymers hereinbefore described into a hydrocarbon producing system is a "squeeze" treatment.

Although the method of the invention may be carried out on a hydrocarbon producing system (e.g. a subterranean formation) without any pre-flush, it is preferred to treat the formation with a pre-flush composition prior to treatment with the copolymer described herein. The purpose of the pre-flush may be, for example, to wet the surface of the formation (e.g. if the formation is oil-rich) to aid retention of the copolymer described herein. The pre-flush composition may therefore include a surfactant.

An after-flush or over-flush composition may also be optionally used in the method of the invention. An after-flush is typically done following addition of the copolymer described herein. It serves to displace any copolymer which has not absorbed onto the surface of the formation out of the well bore. Any convenient aqueous or non-aqueous, preferably aqueous, liquid may be used.

Treatment times or periods of shut in will depend on a number of factors including the nature of the copolymer used, the nature of the formation and the level of scaling which would otherwise occur. Typical shut in times may be readily determined by those skilled in the art and will generally be in the range from 0.5 to 24 hours, preferably 1 to 16 hours, e.g. about 8 to 12 hours.

The invention will now be further described by way of the following non-limiting Examples:

EXAMPLE 1

A copolymer of acrylic acid and DADMAC was prepared in a 1 m³ reactor equipped with a mechanical stirrer, a condenser, a thermometer and inlets. The following materials were used:

| | |
|---|---|
| Acrylic acid | 180 kg |
| DADMAC (60% in water) | 20 kg |
| Sodium hypophosphite | 20 kg (in 40 kg deionised water) |
| Sodium persulfate | 1.8 kg (in 6 kg deionised water) |
| NaOH | 70 kg (in 114 kg deionised water) |

200 kg deionised water was added to the reactor and heated to 60° C. The monomers (i.e. acrylic acid and DADMAC) were then added and the solution stirred. NaOH was added to neutralise the reaction mixture and the initiator (sodium persulfate) and chain transfer agent (sodium hypophosphite) were added to induce polymerisation. The reaction mixture was then heated to reflux and stirred for 2 hours. The resulting copolymer was then isolated.

Figure 1:
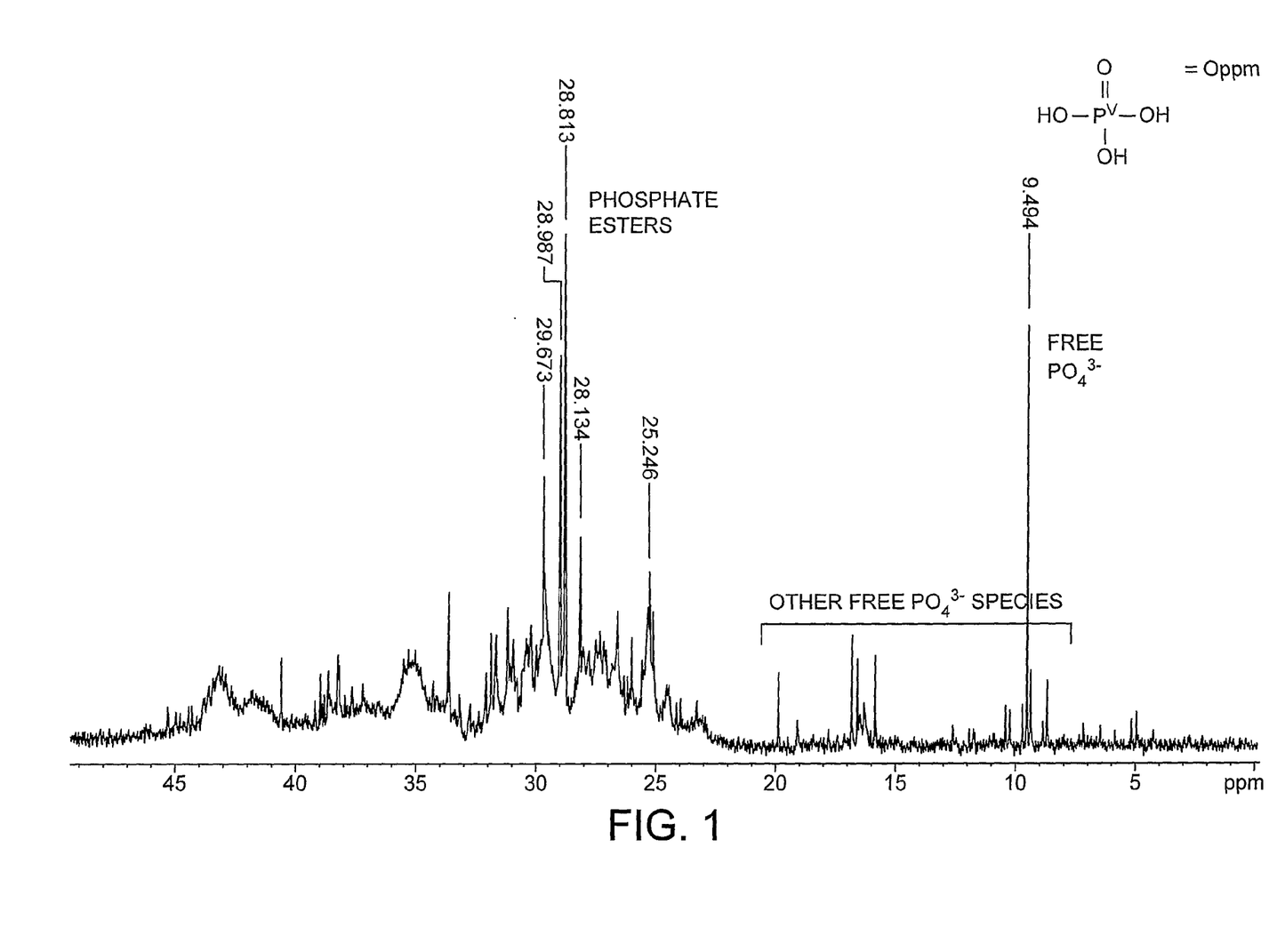

140 µl of copolymer was dissolved in 560 µl of $D_2O$. A broadband decoupled $^{31}P$ spectrum was obtained (with zero point set to 85% $H_3PO_4$). The spectrum is shown in FIG. 1.

The spectrum shows two regions; 50-20 ppm containing phosphate ester species and 20-0 ppm containing free phosphate species. Integration of the peaks in each area indicate that only 3-5% of the phosphate species are not bound to carbon.

In the region 50-20 ppm there are both narrow and broad peaks; narrow peaks indicate low molecular weight species (e.g. monomers, dimers, trimers) and broad peaks indicate polymers. The amount of carbon bound phosphate present as phosphate esters of polymeric species was determined by integration of the peaks in this region with peaks having a peak width of 30 Hz or more being classed as polymeric phosphate esters. By this method it was calculated that 74-79% of the phosphate is present as phosphate esters of polymers.

EXAMPLE 2

Dynamic loop tests were conducted in order to evaluate the performance of a DADMAC (diallyldimethyl ammonium chloride) and acrylic acid copolymer in scale control. Loop tests using a polyacrylate polymer as a scale inhibitor were also carried out for comparative purposes.

The brines used in the studies were synthetic Heidrun formation water, seawater and a 6% NaCl brine made from dissolved salts. The compositions of these brines are given in Table 1:

TABLE 1

| Composition of Brines | | |
|---|---|---|
| Composition (mg/l) | Heidrun FormationWater | Sea water |
| $Na^+$ | 19510 | 11150 |
| $K^+$ | 545 | 420 |
| $Ca^{2+}$ | 1020 | 428 |
| $Ma^{2+}$ | 265 | 1410 |
| $Ba^{2+}$ | 255 | 0 |
| $Sr^{2+}$ | 145 | 0 |
| $SO_4^{2-}$ | 0 | 2800 |
| $Cl^-$ | 33190 | 20310 |

The dynamic scale inhibitor performance test is designed to evaluate the ability of the test inhibitor to delay the nucleation and growth of scale on a pre-scaled metal surface. All tests were performed with mixed brines, i.e. 50:50 Heidrun formation water:seawater (see Table 1). The test conditions were designed to represent an extreme case of barium sulphate scaling.

Figure 2:
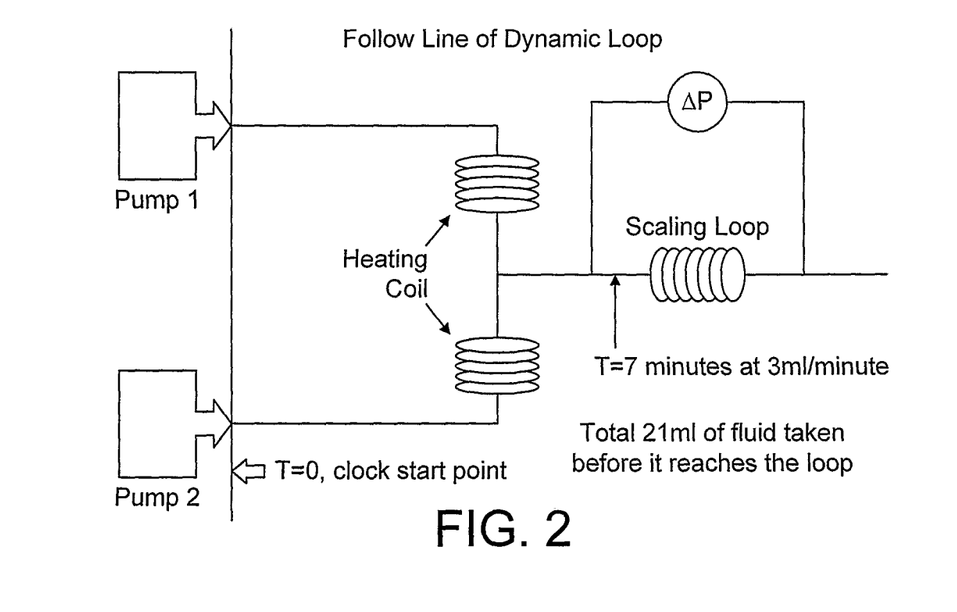

A schematic of the equipment used is presented in FIG. 2. In the tests, the formation water and seawater were separated into non-scaling cation and anion brine fractions such that on mixing the anion and cation brine fractions the mixed brine would be representative of 50:50 mixed formation water and sea water. The barium is present in the cation brine and sulphate is present in the anion brine. The two brines were pumped separately into the heating coil using two pumps (this ensures the fluids reach the test temperature before they mix in the loop). After passing the heating coil, the cation and anion brines were then mixed at the T-junction of the inlet of the scale loop. The formation of scale within the scale loop was tracked by measuring the differential pressure changes across the loop as a function of time. Scale inhibitors are designed to prevent the adhesion and growth of scale within the scale loop and thus prevent an increase in differential pressure at a particular concentration. This is termed the minimum inhibitor concentration (MIC).

The transport time for the anion and cation brines prior to mixing was 7 minutes at a pump rate of 3 ml/minute. This represents a dead volume of 21 ml of total fluid, pumped by each pump.

The test conditions were set as below:

| | |
|---|---|
| Temperature: | 85° C. |
| Ambient pH of mixed brine: | 6.5 ± 0.3 (adjusted with 0.1M NaOH) |
| Coil length: | 1 m |
| Coil internal diameter: | ~0.9 mm |
| Flow rate: | 14 ml/min |
| Pre-scale: | no |

Following each test, the loop was cleaned with 50 ml scale dissolver, 50 ml de-ionised (DI) water, 50 ml 1% acetic acid solution then DI water until pH=7±1. The lowest inhibitor concentrations to inhibit scale formation for 3 hours are shown in FIG. 3 (for inhibitors according to the present invention) and FIG. 4 (for polyacrylate inhibitor).

Figure 3:
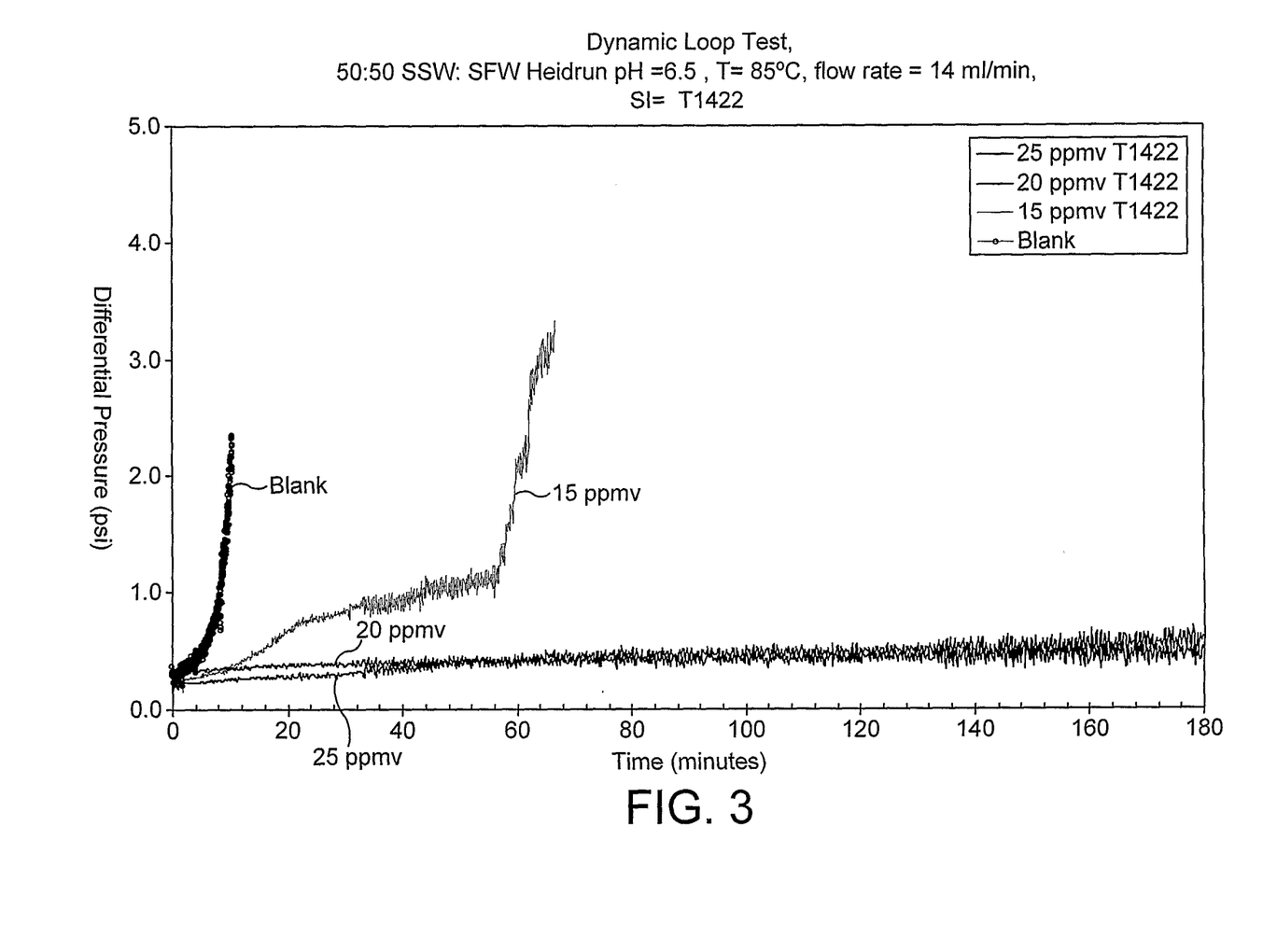
Figure 4:
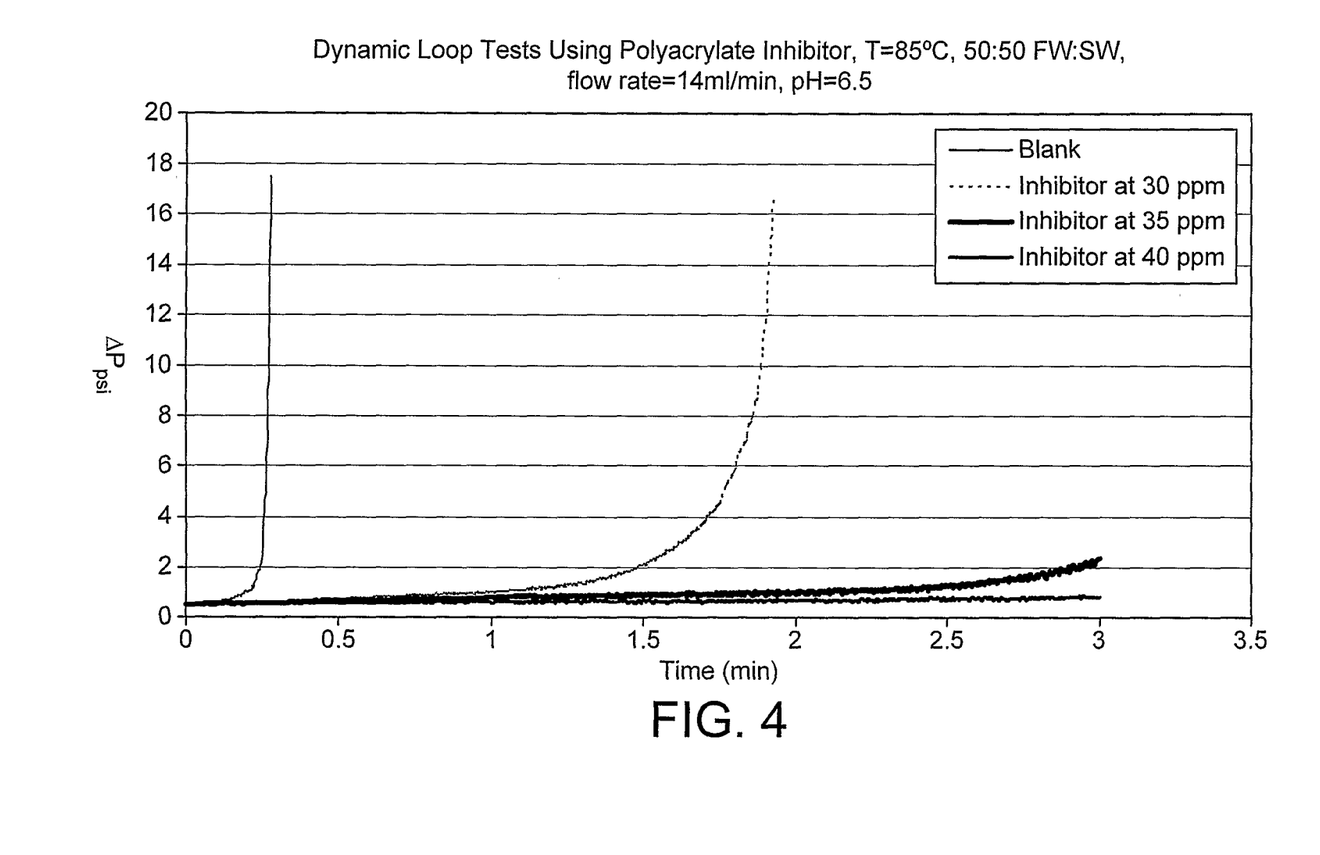

The plots in FIGS. 3 and 4 show the differential pressure measured vs. time. In FIG. 3 the line marked "Blank" represents the test without scale inhibitor where scale quickly built up inside the coil resulting in a steep increase in the differential pressures. The grey line represents the test where 15 ppm of scale inhibitor was present in the mixed brine. The differential pressure increase was delayed due to the presence of 15 ppm of scale inhibitor. The black lines represent the tests at 20 and 25 ppm scale inhibitor respectively. Both black lines clearly show that when the inhibitor concentration was increased to 20 and 25 ppm, the barium sulphate scale precipitation was well controlled, resulting in stable differential pressure readings. In contrast, FIG. 4 shows that at least 35 ppm polyacrylate inhibitor are required to control barium sulfate scale precipitation.

The dynamic loop tests demonstrate that the polymer material of the present invention is an effective scale inhibitor under North Sea reservoir conditions. Under the given conditions where the barium concentration is as high as 285 ppm, the scale inhibitor can control the barium sulphate precipitation in the dynamic loop at 20 ppm at 3 hours test interval.

EXAMPLE 3

Inhibitor adsorption/desorption tests were conducted in order to evaluate the performance of a DADMAC (diallyldimethyl ammonium chloride) and acrylic acid copolymer in scale control.

One of the important properties of a downhole squeeze scale inhibitor is its adsorption/desorption on a rock surface. In order to achieve a good inhibitor squeeze lifetime, a scale inhibitor has to adsorb onto the reservoir rock surface. A slow release (desorption) of the inhibitor from the rock surface into the reservoir brine ensures long term protection of the well and well bore area against scale precipitation. The following procedure was designed to study the properties of inhibitor adsorption/desorption.

Inhibitor Adsorption:

Core rock materials were crushed from core plugs obtained from Heidrun reservoirs and sieved to less than 2 mm size fraction. The rock material was then allowed to dry. 16 g of the crushed core rock material were mixed with 32 ml of each test solution at 1000 ppm (as supplied in 6% NaCl brine) in 60 ml HDPE bottles.

The adsorption test procedure can be summarised as follows:
1. Make up 500 ml scale inhibitor solution at 1000 ppm as supplied in 6% NaCl brine (w/w).
2. Adjust the stock to the required pH values.
3. Weigh out 16 g of crushed rock material and pour into a 60 ml HDPE bottle.
4. Pipette 32 ml of each scale inhibitor solution into the HDPE bottle containing the crushed core and place in the oven at 80° C.
5. After 24 hours carefully take 20 ml of the supernatant from each sample and replace it with the synthetic Heidrun formation water.
6. Analyse scale inhibitor concentrations in both the stocks (non contact with crushed core materials). Determine the amount of adsorption from the difference in the inhibitor concentration of each supernatant and the stock solutions.
7. Analyse pH in the supernatant.

Inhibitor Desorption:

At the end of the inhibitor adsorption test, inhibitor desorption was then started by gently replacing the supernatant of the inhibitor solution with synthetic Heidrun formation brine. This was done by taking 20 ml of the supernatant from the bottle and adding 20 ml of the synthetic formation brine quickly to the bottle. During the inhibitor desorption stage, the supernatant of the formation brine was repeatedly replaced by fresh formation brine and the inhibitor concentration was determined for the replaced samples.

Results:

Table 2 summarises the initial inhibitor concentrations, final inhibitor concentrations and inhibitor adsorption levels at pH 3, 5 and 7. At each pH value, the tests were carried out with the duplicated samples. From Table 2, it can be seen that at pH 3 the inhibitor adsorptions are 0.436 and 0.468 mg/g. At pH 5, the inhibitor adsorption levels are 0.242 and 0.254 mg/g. At pH 7, the inhibitor adsorption levels are 0.256 and 0.244 mg/g.

TABLE 2

Inhibitor Adsorption Levels (mg inhibitor/g crushed rock)

| Sample No. | pH | Initial Conc. (ppm) | Conc. after 24 hrs (ppm) | Adsorption (mg/g) |
|---|---|---|---|---|
| 1 | 3 | 1000 | 782 | 0.436 |
| 2 | 3 | 1000 | 766 | 0.468 |
| 3 | 5 | 1000 | 879 | 0.242 |
| 4 | 5 | 1000 | 873 | 0.254 |
| 5 | 7 | 1000 | 872 | 0.256 |
| 6 | 7 | 1000 | 878 | 0.244 |

The results in Table 2 demonstrate that the inhibitor can be adsorbed onto the rock surface. The inhibitor adsorption levels at pH 3 are higher than that at pH 5 and 7. At pH 5 and 7 the inhibitor adsorption levels are almost equal.

Table 3 summarises the results of the inhibitor desorption tests. Taking into account the dilution factor and using Sample 1 as an example, the concentrations of both scale inhibitors at the starting point of desorption was calculated as follows:

$$\text{Inhibitor concentration: } 782 \text{ ppm} \times (32-20) \text{ml}/32 \text{ ml} = 293 \text{ ppm}$$

TABLE 3

Inhibitor Desorption Tests

| Sample No. | pH | ppm at t = 0 after 20 ml supernatant replaced by 20 ml FW | ppm at t = 1 hr after 20 ml supernatant replaced by 20 ml FW | ppm at t = 0 after 20 ml supernatant replaced by 20 ml FW | ppm at t = 1 hr after 20 ml supernatant replaced by 20 ml FW |
|---|---|---|---|---|---|
| 1 | 3 | 293 | 380 | 143 | 205 |
| 2 | 3 | 287 | 370 | 139 | 206 |
| 3 | 5 | 330 | 425 | 159 | 209 |
| 4 | 5 | 327 | 436 | 164 | 211 |
| 5 | 7 | 327 | 444 | 167 | 246 |
| 6 | 7 | 329 | 445 | 167 | 242 |

Table 3 shows all inhibitor concentrations after the supernatant in the adsorption samples was replaced with the fresh formation brine just after the replacement (t=0) and after 1 hour, respectively. For Samples 1 and 2, just after the supernatant was replaced by fresh formation water, inhibitor concentrations were 293 and 287 ppm respectively. After 1 hour, inhibitor concentration increased to 380 and 370 ppm respectively. The increase in inhibitor concentration was due to the release of adsorbed inhibitor to the fluid demonstrating that the inhibitor can be desorbed. At 380 and 370 ppm for Samples 1 and 2, the replacement of supernatants was repeated. As seen in Table 3, the inhibitor concentrations were diluted to 143 and 139 ppm respectively. After a further 1 hour, the inhibitor concentrations for Samples 1 and 2 increased to 205 and 206 ppm as a result of the inhibitor desorption.

A similar result is also shown for Samples 3-6 in Table 3. That is, at pH 5 and 7, the adsorbed inhibitor can be desorbed when the supernatants are replaced by the fresh brine.

The invention claimed is:

1. A method for inhibiting scale formation within a hydrocarbon producing system, said method comprising performing a squeeze treatment comprising contacting said system with a copolymer formed from a diallyl ammonium salt of formula (I)

(I)

wherein $R^1$ and $R^2$ are each independently hydrogen or unsubstituted organic radicals having from 1 to 20 carbon atoms;
wherein each R is independently selected from hydrogen or organic radicals having from 1 to 20 carbon atoms; and
X is a counterion;
and at least one anionic monomer of formula (II):

(IIa)

(IIb)

wherein $R^3$ is $-CO_2Z$, $-SO_3Z$, $-PO_3Z_2$ or an alkyl or aryl group -substituted with at least one $-CO_2Z$, $-SO_3Z$ or $-PO_3Z_2$ group in which Z is a hydrogen atom or a univalent metal atom; and
wherein $R^4$, $R^5$ and $R^6$ are each independently hydrogen, an optionally substituted alkyl or aryl group having from 1 to 6 carbon atoms, $-CO_2Z$, $-SO_3Z$, $-PO_3Z_2$ or an alkyl or aryl group substituted with at least one $-CO_2Z$, $-SO_3Z$ or $-PO_3Z_2$ group in which Z is a hydrogen atom or a univalent metal atom, wherein said copolymer does not comprise acrylamide monomers and said copolymer comprises at least 5 wt % of said diallyl ammonium salt relative to the total weight of monomers, such that scale formation within the hydrocarbon producing system is inhibited by said squeeze treatment, and wherein the copolymer comprises at least one inorganic end group selected from $-SO_4H_2$, $-SO_3H$, $-H_2PO_3$, or $-H_2PO_4$, or salts thereof.

2. A method as claimed in claim 1, wherein said copolymer comprises 5 to 20 wt % of said diallyl ammonium salt relative to the total weight of monomers.

3. A method as claimed in claim 1, wherein said copolymer is formed from diallyl dimethyl ammonium chloride.

4. A method as claimed in claim 1, wherein $R^3$ is a $-CO_2Z$, $-SO_3Z$, or $-PO_3Z_2$ group.

5. A method as claimed in claim 1, wherein said anionic monomer is selected from acrylic acid, methacrylic acid, vinyl sulfonic acid, vinyl phosphonic acid, maleic anhydride, itaconic acid, maleic acid or styrene sulfonic acid.

6. A method as claimed in claim 1, wherein said anionic monomer is selected from acrylic acid, vinyl sulfonic acid or vinyl phosphonic acid.

7. A method as claimed in claim 1, wherein said copolymer is formed from anionic monomers of formula (II) providing at least two different anionic groups.

8. A method as claimed in claim 1, wherein said copolymer does not comprise non-ionic monomer.

9. A method as claimed in claim 1, wherein said copolymer comprises repeating units represented by formula (III) and/or formula (IV)

(III)

(IV)

wherein $R^1$ and $R^2$ are each independently hydrogen or unsubstituted organic radicals having from 1 to 20 carbon atoms;
wherein each R is independently selected from hydrogen or organic radicals having from 1 to 20 carbon atoms;
wherein X is a counterion;
wherein $R^3$ is $-CO_2Z$, $-SO_3Z$, $-PO_3Z_2$ or an alkyl or aryl group substituted with at least one $-CO_2Z$, $-SO_3Z$ or $-PO_3Z_2$ group in which Z is a hydrogen atom or a univalent metal atom;
wherein $R^4$, $R^5$ and $R^6$ are each independently hydrogen, an optionally substituted alkyl or aryl group having from 1 to 6 carbon atoms, $-CO_2Z$, $-SO_3Z$, $-PO_3Z_2$ or an alkyl or aryl group substituted with at least one $-CO_2Z$, $-SO_3Z$ or $-PO_3Z_2$ group in which Z is a hydrogen atom or a univalent metal atom;
wherein n is 1 to 50; and
wherein m is 10 to 200.

10. A method as claimed in claim 1, wherein the weight average molecular weight of said copolymer is in the range of 800 to 500,000.

11. A method as claimed in claim 1, wherein said copolymer is applied as a dispersion or solution in a liquid carrier.

12. A method as claimed in claim 11, wherein said copolymer is present in said liquid carrier at a concentration of 6-50% wt.

13. A method as claimed in claim 1, wherein $R^1$ and $R^2$ in formula (I) are both methyl.

14. A method as claimed in claim 4, wherein $R^3$ is a —$CO_2Z$ or a —$PO_3Z_2$ group.

15. A method as claimed in claim 14, wherein $R^3$ is a —$PO_3Z_2$ group.

16. A method as claimed in claim 6, wherein said anionic monomer is selected from acrylic acid or vinyl phosphonic acid.

17. A method as claimed in claim 16, wherein said anionic monomer is vinyl phosphonic acid.

18. A method as claimed in claim 10, wherein the weight average molecular weight of said copolymer is in the range 1,000 to 100,000.

\* \* \* \* \*

UNITED STATES PATENT AND TRADEMARK OFFICE
CERTIFICATE OF CORRECTION

PATENT NO. : 8,586,511 B2  Page 1 of 1
APPLICATION NO. : 11/997879
DATED : November 19, 2013
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 496 days.

Signed and Sealed this
Twenty-second Day of September, 2015

Michelle K. Lee
*Director of the United States Patent and Trademark Office*